(12) United States Patent
Yonaha (10) Patent No.: US 7,995,239 B2
(45) Date of Patent: Aug. 9, 2011

(54) IMAGE OUTPUT APPARATUS, METHOD AND PROGRAM

(75) Inventor: Makoto Yonaha, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 824 days.

(21) Appl. No.: 11/091,712

(22) Filed: Mar. 29, 2005

(65) Prior Publication Data

US 2005/0243348 A1  Nov. 3, 2005

(30) Foreign Application Priority Data

Mar. 29, 2004  (JP) .................................. 2004-09550

(51) Int. Cl.
*G06F 15/00* (2006.01)
*G06K 15/00* (2006.01)
*G06K 9/00* (2006.01)
*G06K 9/46* (2006.01)
*G06K 9/66* (2006.01)
*G06K 9/40* (2006.01)
*G06K 9/36* (2006.01)
*G06T 5/00* (2006.01)
*H04N 1/407* (2006.01)
*H04N 1/409* (2006.01)
*G03F 3/10* (2006.01)

(52) U.S. Cl. ....... 358/1.9; 358/1.18; 358/3.26; 358/527; 382/115; 382/118; 382/162; 382/190; 382/254; 382/291

(58) Field of Classification Search .................... 358/1.9
See application file for complete search history.

(56) References Cited

U.S. PATENT DOCUMENTS

| | | | |
|---|---|---|---|
| 6,473,198 B1 | 10/2002 | Matama | |
| 6,571,002 B1 * | 5/2003 | Ogawa | 382/117 |
| 6,728,404 B1 * | 4/2004 | Ono et al. | 382/190 |
| 7,038,715 B1 * | 5/2006 | Flinchbaugh | 348/207.99 |
| 7,039,222 B2 * | 5/2006 | Simon et al. | 382/118 |
| 7,106,887 B2 | 9/2006 | Kinjo | |
| 7,203,367 B2 * | 4/2007 | Shniberg et al. | 382/224 |
| 7,228,560 B2 * | 6/2007 | Panabaker | 725/114 |
| 7,324,670 B2 * | 1/2008 | Kozakaya et al. | 382/118 |
| 7,330,570 B2 * | 2/2008 | Sogo et al. | 382/115 |
| 2001/0007504 A1 * | 7/2001 | Kagaya | 358/1.15 |
| 2002/0015514 A1 * | 2/2002 | Kinjo | 382/118 |
| 2002/0093670 A1 | 7/2002 | Luo et al. | |
| 2002/0109854 A1 * | 8/2002 | Murray et al. | 358/1.9 |
| 2004/0021779 A1 * | 2/2004 | Yano | 348/222.1 |

FOREIGN PATENT DOCUMENTS

| | | |
|---|---|---|
| JP | 7-296299 A | 11/1995 |
| JP | 8-279918 A | 10/1996 |
| JP | 11-091169 A | 4/1999 |
| JP | 11-144433 A | 5/1999 |

(Continued)

*Primary Examiner* — Benny Q Tieu
*Assistant Examiner* — Fan Zhang
(74) *Attorney, Agent, or Firm* — Sughrue Mion, PLLC (57) ABSTRACT

Correction processing is performed on a region that requires correction processing, in a photographed image obtained by taking a photograph of a subject, and a corrected image is obtained. The degree of effect is calculated in the corrected image. Then, judgment is made, based on the magnitude of the degree of effect, as to whether it is required to check the effect of correction processing performed on the photographed image. If it is judged that it is required to check the effect of correction processing, at least one of the photographed image and the corrected image is displayed to check the effect. Then, the corrected image is printed.

20 Claims, 5 Drawing Sheets

FOREIGN PATENT DOCUMENTS

| | | |
|---|---|---|
| JP | 2001-42451 A | 2/2001 |
| JP | 2002-077592 A | 3/2002 |
| JP | 2003-076507 A | 3/2003 |
| JP | 2003-320733 A | 11/2003 |

* cited by examiner

FIG.2A

| 1 | 1 | 1 |
|---|---|---|
| 0 | 0 | 0 |
| -1 | -1 | -1 |

FIG.2B

| 1 | 0 | -1 |
|---|---|---|
| 1 | 0 | -1 |
| 1 | 0 | -1 |

IMAGE OUTPUT APPARATUS, METHOD AND PROGRAM

BACKGROUND OF THE INVENTION

1. Field of the Invention

The present invention relates to an image output apparatus for printing images, obtained by taking photographs with a digital camera or the like. The present invention also relates to an image output method and an image output program.

2. Description of the Related Art

In recent years, as digital cameras have rapidly become popular, many users of the digital cameras transfer image data, stored in the memories of their digital cameras, to their personal computers, and print the image data with their color printers. However, if they do not have their personal computers, or if they are not familiar with such operations, it is difficult for them to print out images. Therefore, photo finish services (for example, a DPE (development, print, and enlargement) service) for printing photographs based on image data, which was output from digital still cameras, or the like, are provided.

When the users of the digital cameras use the photo finish service, they detach the memories from the camera bodies of their cameras, and take the memories to a photograph shop, which provides a photo finish service. The stored image data is read out from the memories at a terminal device of the photograph shop, and sent to a photo finish service center online. Then, images are printed on ordinary photographic paper at the photo finish service center. The print, produced at the photo finish service center, is delivered to the photograph shop, which sent the image data. In this system, a few days are required to obtain the print of the image data. One of the characteristics of the digital cameras is that the users can look at the photographs or prints of image data immediately after photography. Therefore, the amount of time required in this system is contradictory to users' expectations for fast operations.

When the users use a digital print machine, provided at a convenience store or the like, they detach the memories from the camera bodies of their cameras. Image data, stored in a recording medium, is read out at the digital print machine, and an image, represented by the image data, is printed on ordinary photographic paper at the digital print machine. The dynamic range of an image, which is represented by image data obtained by taking a photograph with a digital camera, is narrower than that of an image obtained by using a negative film. When the image is obtained with the digital camera, a part of information, such as data representing a region of the image, having brightness, which is higher than or equal to a predetermined brightness, is lost in some cases. However, the users, who request prints of images, obtained with the digital camera, expect that high-quality prints, which are similar to prints obtained from negative films, will be produced.

Therefore, the characteristics of image data as digitized data are utilized, and image processing is automatically performed on the image data to produce high quality prints, which are similar to that of photographs printed from negative films. In the image processing, processing is performed to reflect intentions of the photographers and the characteristics of each digital camera, which was used to take photographs. Image processing is performed based on a fixed light source type mode, an image processing condition (an AWB (automatic white balance) processing condition, and related processing conditions such as gradation, sharpness, and saturation), a taste of the photographer (monochrome/sepia, beautiful skin, or the like), and a photography mode (extended exposure, under exposure, or the like). Further, blur correction processing is performed by analyzing the image data and detecting a blur (an out-of-focus blur due to an unfocused focal length and a camera-shake blur due to hand movement of the photographer) in a photographed image. Then, the blur is corrected accordingly. In recent years, it has become possible to automatically detect a face, eyes, or the like in a photographed image with high accuracy. Accordingly, a method has been proposed to automatically correct images based on the detection result (Japanese Unexamined Patent Publication No. 2001-042451).

However, when image data is automatically corrected, the image data is not always corrected to produce an image which reflects the intention of the photographer. Therefore, a method has been proposed, in which when the image data is automatically corrected, a print of the corrected image data and a print of uncorrected image data are printed, and both of the prints are given to a customer (U.S. patent application Publication No. 20020093670).

However, in the method of always giving both of the print of the corrected image data and the print of the uncorrected image data to the photographer, as described above, the number of prints increases, and printing costs increase. However, if only the image data after automatic image processing is printed, and the print is given to the photographer, it is impossible for the photographer to recognize the effect of image processing, performed on the image data.

Further, the photographer may not want image processing performed on all of the image data. In some cases, the photographer wants only image processing performed if the image processing is effective, such as red-eye correction.

SUMMARY OF THE INVENTION

In view of the foregoing circumstances, it is an object of the present invention to provide an image output apparatus, an image output method and an image output program for printing images by automatically performing correction processing except correction processing, which is not necessarily wanted by a photographer.

The image output apparatus according to the present invention is an image output apparatus comprising:

an effect degree calculation means for calculating the degree of effect in a corrected image, obtained by performing correction processing on a region that requires correction, in a photographed image obtained by taking a photograph of a subject;

a check requirement judgment means for judging, based on the magnitude of the degree of effect, whether it is required to check the effect of correction processing performed on the photographed image;

a check display means for displaying at least one of the photographed image and the corrected image to check the effect of correction processing, if the check requirement judgment means judges that it is required to check the effect of correction processing performed on the photographed image;

an image output instruction means for instructing output of the corrected image after at least one of the images is displayed to check the effect; and an image output means for outputting the instructed corrected image.

The program according to the present invention is program for causing a computer to function as:

an effect degree calculation means for calculating the degree of effect in a corrected image, obtained by performing correction processing on a region that requires correction, in a photographed image obtained by taking a photograph of a subject;

a check requirement judgment means for judging, based on the magnitude of the degree of effect, whether it is required to check the effect of correction processing performed on the photographed image;

a check display means for displaying at least one of the photographed image and the corrected image to check the effect of correction processing, if the check requirement judgment means judges that it is required to check the effect of correction processing performed on the photographed image;

an image output instruction means for instructing output of the corrected image after at least one of the images is displayed to check the effect; and an image output means for outputting the instructed corrected image.

The image output method according to the present invention is an image output method comprising the steps of:

effect degree calculation for calculating the degree of effect in a corrected image, obtained by performing correction processing on a region that requires correction, in a photographed image obtained by taking a photograph of a subject;

check requirement judgment for judging, based on the magnitude of the degree of effect, whether it is required to check the effect of correction processing performed on the photographed image;

check display for displaying at least one of the photographed image and the corrected image to check the effect of correction processing, if it is judged in the check requirement judgment that it is required to check the effect of correction processing performed on the photographed image;

image output instruction for instructing output of the corrected image after at least one of the images is displayed to check the effect; and image output for outputting the instructed corrected image.

The "degree of effect" refers to an index for judging, by comparing the corrected image after correction processing and the photographed image before correction processing, whether correction is effective.

The "correction processing" includes various kinds of processing such as red-eye correction processing, camera-shake correction processing, and image optimization processing.

The output means may be a printer.

The printer may print the corrected image on the front surface of a print medium, and print the contents of the correction processing having a large degree of effect, which was administered on the corrected image, on the rear surface of the print medium.

The output means may alternatively be a recording device, for recording onto electronic recording media.

The recording device may record the photographed image in an electronic recording medium along with the corrected image.

In the case that a plurality of correction processes are administered on the corrected image, the effect degree calculation means may weight the degree of effect for each of the correction processes, when calculating the degree of effect of the corrected image.

In addition, the effect degree calculation means may calculate a degree of effect according to the area of the region that requires correction.

Alternatively, the effect degree calculation means may calculate a degree of effect according to variations in pixel values of the region that requires correction between the corrected image and the photographed image.

The check requirement judgment means may be a means for judging that it is required to check the effect of correction processing in the corrected image if the degree of effect in the corrected image is higher than a predetermined threshold value.

The check display means may be a means for displaying at least one of the photographed image and the corrected image among a plurality of corrected images sequentially in decreasing order of the degree of effect, from the corrected image in which the degree of effect is the highest, to check the effect of correction processing.

Further, the image output apparatus according to the present invention may further include a face detection means for detecting the face of the subject. The region that requires correction may be a facial region, detected by the face detection means.

In this case, the effect degree calculation means may calculate a degree of effect according to the area of the facial region.

Alternatively, the effect degree calculation means may calculate a degree of effect according to the inclination of the detected face.

As a further alternative, the degree effect calculation means may calculate a degree of effect according to the position of the facial region, detected within the photographed image.

The image output apparatus may further comprise a face checking means, for checking whether the detected face is one of a plurality of faces of subjects, which are registered in advance. In this case, the degree effect calculation means calculates a degree of effect according to whether the checked face is the face of one of the pre-registered subjects.

Further, the image output apparatus according to the present invention may further include a red-eye detection means for detecting a red-eye region of the subject. The region that requires correction may be the red-eye region of the subject, detected by the red-eye detection means. The correction processing may be red-eye correction processing.

According to the present invention, correction processing is performed on a photographed image, and the degree of correction effect is calculated in an obtained corrected image. Then, the corrected image is displayed, based on the magnitude of the degree of effect, so as to check the effect of correction processing. Then, only if print of a corrected image is instructed, the corrected image is printed. Accordingly, photographers can select images, in which effective correction has been performed, and print only the selected corrected images.

Further, when the corrected image is displayed so as to check the effect of correction processing, if the corrected image is displayed sequentially from a corrected image, in which the degree of effect is the highest, a corrected image, in which the degree of effect is high, can be selected.

Further, when correction processing is performed by detecting a face or red-eye region, the degree of effect of correction processing is high in many cases. Therefore, a corrected image, in which the degree of effect is high, can be easily selected.

Note that the program of the present invention may be provided being recorded on a computer readable medium. Those who are skilled in the art would know that computer readable media are not limited to any specific type of device, and include, but are not limited to: floppy disks, CDs, RAMs, ROMs, hard disks, magnetic tapes, on which computer instructions can be stored. Transmission of the computer instructions through a network is also within the scope of this invention. Additionally, computer instructions include, but are not limited to: source, object and executable code, and can be in any language including higher level languages, assembly language, and machine language.

DESCRIPTION OF THE PREFERRED EMBODIMENTS

Hereinafter, embodiments of an image output apparatus, which carries out an image output method according to the present invention, will be described with reference to the attached drawings.

Figure 1:
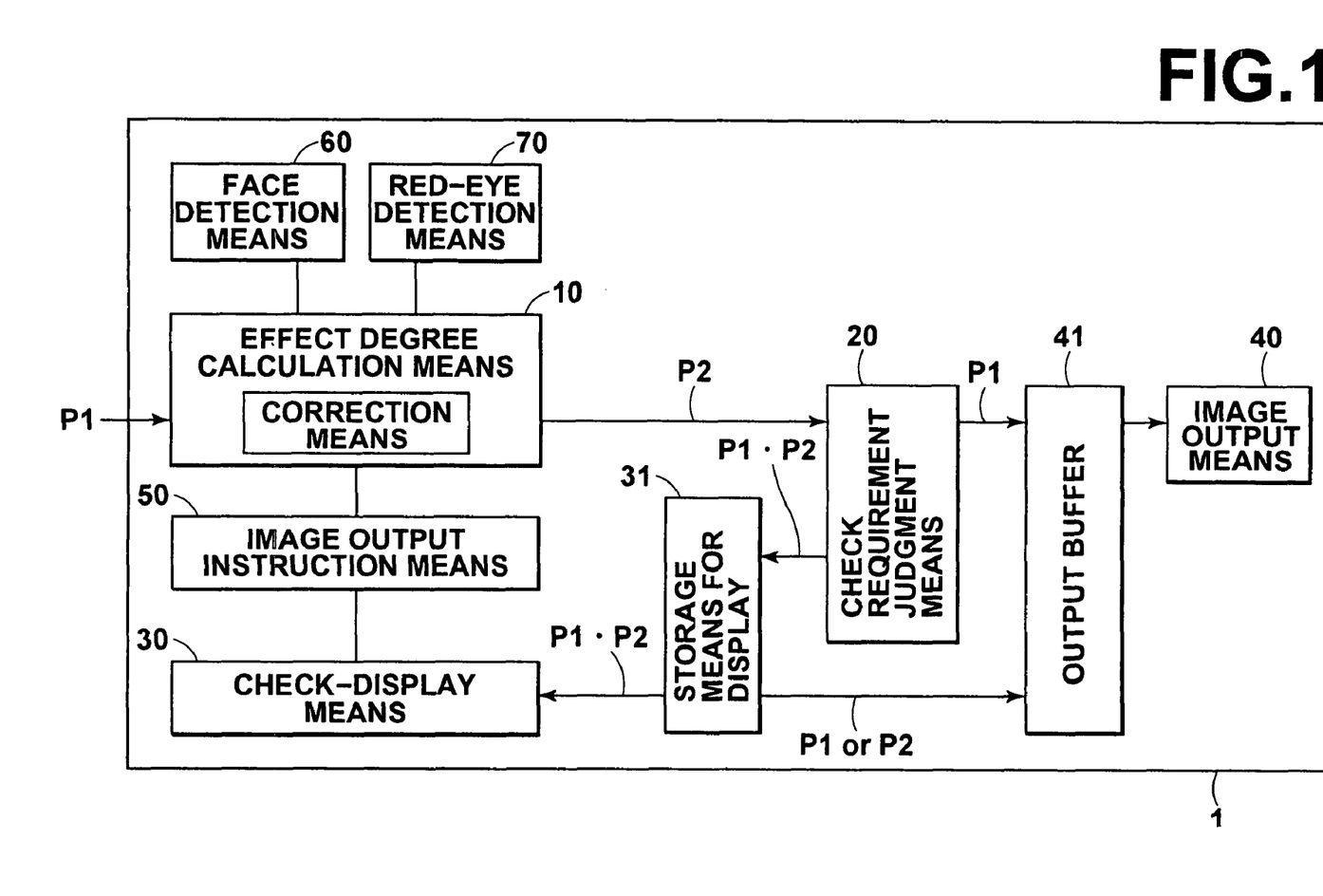
FIG. 1 is a diagram illustrating the schematic configuration of an image output apparatus according to the present invention.

An image output apparatus 1 according to the present invention includes an effect degree calculation means 10 for calculating the degree of effect in a corrected image P2, which was obtained by performing correction processing on a predetermined region of a photographed image P1 obtained by taking a photograph of a subject, as illustrated in FIG. 1. The image output apparatus 1 also includes a check requirement judgment means 20 for judging, based on the magnitude of the degree of effect, whether it is required to check the effect of correction processing performed on the photographed image P1. The image output apparatus 1 also includes a check-display means 30 for displaying at least one of the photographed image P1 and the corrected image P2 if it is judged that it is required to check the effect of correction processing. The image output apparatus 1 also includes an image output instruction means 50 for giving instructions to output the corrected image P2, which has been displayed to check the effect of correction processing. The image output apparatus 1 also includes an image output means 40 for outputting the corrected image P2, for which the image output instruction has been given.

Further, the image output apparatus 1 includes a face detection means 60 for detecting the facial region of the subject by analyzing the photographed image P1 so that a region, which should be corrected, can be automatically detected. The image output apparatus 1 also includes a red-eye detection means 70 for detecting the face of the subject and further detecting a red-eye region.

In correction processing, there are various kinds of correction processing functions such as image optimization processing, red-eye correction processing, and camera-shake correction processing. A plurality of kinds of correction processing is automatically performed on the photographed image P1 based on settings at the image output apparatus 1, and the corrected image P2 is produced. Further, a region, on which correction processing such as red-eye correction processing and camera-shake correction processing should be performed, is automatically detected in the photographed image P1 by using the face detection means 60 and the red-eye detection means 70. Correction processing is performed on the detected region.

The effect degree calculation means 10 calculates the degree of effect in the corrected image P2, obtained by performing correction processing. When corrected images P2 are produced by performing correction processing, the effect of correction is high in some corrected images P2, however the effect of correction is low in some corrected images P2. For example, when a red-eye region of the subject is corrected by red-eye correction processing, or the brightness of the subject, which was obtained by taking a photograph with backlight, is corrected, the effect of correction processing is high. Further, when the ratio of a region, on which correction processing has been performed, is large in the corrected image P2, or the degree of correction of camera-shake is large, the effect of correction processing is high. The effect is also high when the amount of change in pixel values due to correction processing is large. Therefore, the degree of effect is calculated based on the type of correction processing, the area of a region, on which correction processing has been performed, the amount of change in pixel values per unit of pixels, or the like.

The face detection means 60 extracts a region, which has the characteristic of a face, from the photographed image P1 as a facial region. A face detection method is not limited to a particular method. For examples, a face may be detected by extracting a circular flesh color region or by extracting a circular facial contour. The face may be also detected by extracting a body and a circular shape or by extracting the region of eyes (internal structure of the face) and a circular shape. The face may be also detected by extracting the region of hair and a circular shape (For details, refer to Japanese Unexamined Patent Publication No. 8(1996)-184925).

In face detection processing by extracting a flesh color region in a circular shape, the facial region is detected by extracting a flesh color and a circular shape. Specifically, the hue and saturation of each pixel is detected in the photographed image P1, and a region of pixels (flesh color region), of which the color may be estimated to be a flesh color of persons, is extracted. Generally, a human face is an oval. Therefore, an oval or circular shape, which is estimated to be the human face, is extracted from the extracted flesh color region. The extracted region is used as a facial region candidate. Further, various kinds of major part extraction methods, disclosed in Japanese Unexamined Patent Publication No. 8(1996)-122944, Japanese Unexamined Patent Publication No. 9(1997)-080652, Japanese Unexamined Patent Publication No. 9(1997)-101579, Japanese Unexamined Patent Publication No. 9(1997)-138470, Japanese Unexamined Patent Publication No. 9(1997)-138471, or the like, may also be used.

Further, a discriminator, obtained by learning a plurality of sample images, which are known to be facial images, and a plurality of sample images, which are known to be non-facial images, may be used. When the discriminator is used, assurance that a region, which has been detected as the facial candidate region, is a true facial region is obtained.

Figure 2A:
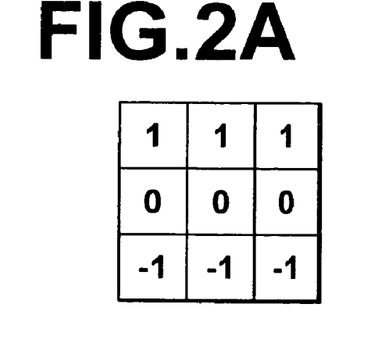
FIG. 2A is a diagram illustrating an example of an edge extraction filter.
Figure 2B:
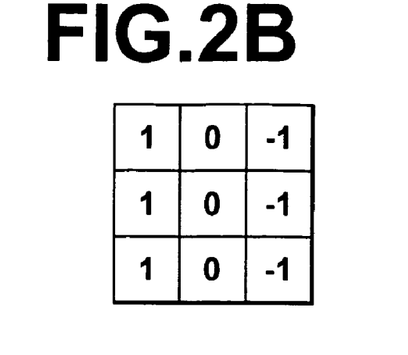
FIG. 2B is a diagram illustrating an example of an edge extraction filter.
Figure 3:
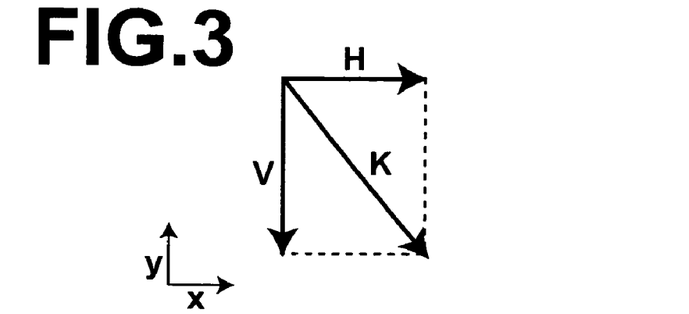
FIG. 3 is a diagram for explaining a gradient vector.
Figure 4A:
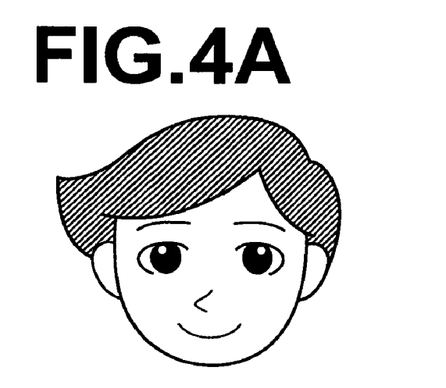
FIG. 4A is a diagram for illustrating the directions of gradient vectors in a person's face.

For example, filtering processing is performed on the facial region of the photographed image P1 by using an edge detection filter for detecting horizontal edges, as illustrated in FIG. 2A, and horizontal edges are detected. Filtering processing is performed on the facial region of the photographed image P1 by using an edge detection filter for detecting vertical edges, as illustrated in FIG. 2B, and vertical edges are detected. Then, a gradient vector K at each pixel of the photographed image P1 is calculated based on the magnitude H of the horizontal edge and the magnitude V of the vertical edge, as illustrated in FIG. 3. When the photographed image P1 includes a human face as illustrated in FIG. 4A, the gradient vector K, calculated as described above, is directed to the center of an eye or a mouth in a dark region such as the eye or the mouth. The gradient vector K, calculated as described above, is directed outward from the position of a nose in a light region such as the nose. Further, since the change in density is large in the region of the eye than the region of the mouth, the magnitude of the gradient vector K at the eye is larger than the magnitude of the gradient vector K at the mouth.

Figure 4B:
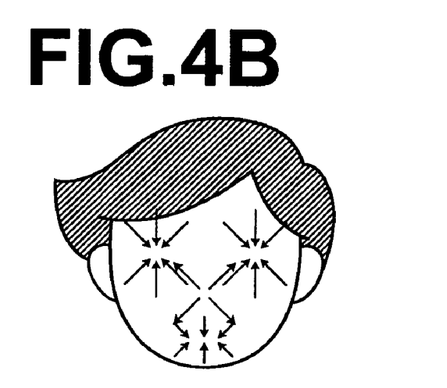
FIG. 4B is a diagram for illustrating the directions of gradient vectors in a person's face.
Figure 5:
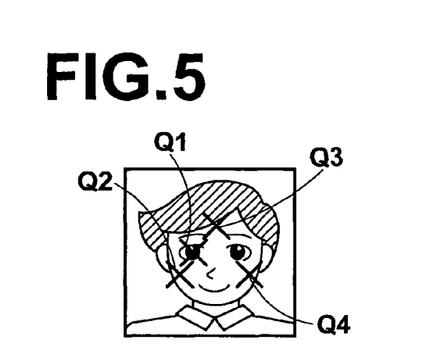
FIG. 5 is a diagram illustrating an example of the characteristics of a face.

Further, in the sample images, which are known to be facial images, the regions of eyes, cheeks, and a forehead are located substantially at predetermined positions depending on the size of a face. The difference in the positions due to individual difference is small. Therefore, as illustrated in FIG. 4B, the center position of a right eye and the center position of a left eye are detected based on the gradient vectors, as illustrated in FIG. 4B. Then, positions Q1, Q2, Q3 and Q4 are set at predetermined positions in the extracted facial region based on the center position of the right eye and the center position of the left eye, as illustrated in FIG. 5. The position Q1 is the center of the right eye, and the position Q2 is the position of a right cheek. The position Q3 is the position of a forehead, and the position Q4 is the position of a left cheek. Then, a gradient vector K is obtained at each of the positions. Then, learning is performed by the discriminator, based on characteristic amounts (for example, the direction and magnitude of the gradient vector K), obtained from the gradient vectors K. Learning is performed by the discriminator by using a plurality of sample images, which are known to be facial images, and a plurality of sample images, which are known to be non-facial images. The discriminator may be configured so that when a positive value is obtained from an image, there is a high probability that the image is a facial image and when a negative value is obtained from the image, there is a high probability that the image is a non-facial image. Accordingly, facial regions can be detected from images that have high probabilities of being facial images first.

The red-eye detection means 70 further detects the region of the eye in the facial region. The red-eye detection means 70 detects a red-eye region based on the hue and saturation at the region of a pupil in the region of the eye.

Figure 6A:
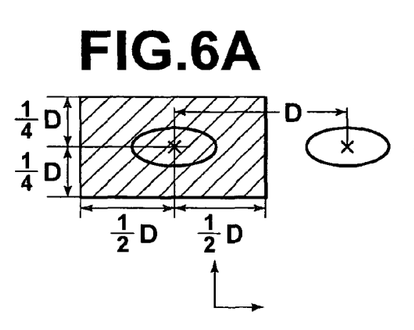
FIG. 6A is a diagram for explaining detection of the center position of a pupil.

In eye detection processing, a facial region is extracted from the photographed image P1, as described above. Further, the regions of the pupils are detected based on the center positions of the right eye and the left eye, as described above. For example, as illustrated in FIG. 6A, a predetermined region including only a left eye or a right eye is extracted based on the distance D between the center positions of both eyes, and a one-eye image, as illustrated in FIG. 6A, is obtained. The region of the one-eye image is a rectangular region with the length of D in an X direction and the length of 0.5 D in a Y direction. The center of the rectangular region is the position of the eye (the center of the eye).

Figure 6B:
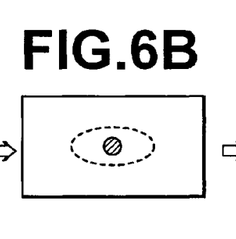
FIG. 6B is a diagram for explaining detection of the center position of a pupil.
Figure 6C:
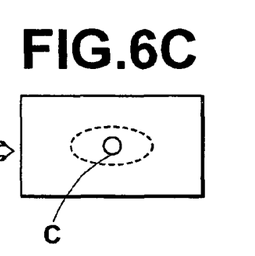
FIG. 6C is a diagram for explaining detection of the center position of a pupil.

Since the shape of a pupil is substantially a circle, if a circular region is detected, the detected region corresponds to the region of the pupil. Therefore, a gray scale image is obtained by performing gray conversion on the one-eye image based on the center position of the eye. When binarization processing is performed on a gray scale image S2 by using a predetermined brightness value as a threshold value, a binary image including pixels, which have pixel values of "0" or "255", for example, may be produced. Accordingly, a binary image (FIG. 6B), in which only the pixels in the region of the pupil have the pixel value of "0", can be produced (FIG. 6B). Further, when edge processing is performed on the binarized image, the contour C of the pupil is extracted (FIG. 6C). Then, the coordinate values of pixels on the contour C of the pupil are voted in a Hough space of a circle (Hough conversion), and the center position of the circle can be obtained. Further, judgment is made as to whether the center position satisfies a criterion for checking the center position of the pupil. If the criterion for checking is satisfied, the obtained center position is judged to be the center position of the pupil. Specifically, the following two criteria for checking may be used.

(1) The difference in Y coordinate values between the center position of a left pupil and the center position of a right pupil is less than or equal to D/50.

(2) The difference in X coordinate values between the center position of a left pupil and the center position of a right pupil is within the range of 0.8×D through 1.2×D.

If the above criteria are satisfied, and the center position is detected as the center position of the pupil, judgment is further made as to whether the region of the pupil is a red-eye region based on the hue and saturation of pixels, existing within the contour C of the pupil. If the judgment is YES, the region of the pupil is detected as the red-eye region.

Further, the check-display means 30 includes a storage means 31 for display (hereinafter referred to as a display buffer), which stores either the corrected image P2 or both of the photographed image P1 and the corrected image P2. The check-display means 30 displays either the corrected image P2 or both of the photographed image P1 and the corrected image P2, stored in the display buffer 31, on a display device.

The image output means 40 is a printer that prints images onto print media, such as printer paper. The corrected images P2 are temporarily spooled in an output storage means 41 (hereinafter referred to as an "output buffer"), which stores the corrected image P2 to be printed. The image output means 40 sequentially prints the spooled corrected images P2, stored in the output buffer 41.

Figure 7:
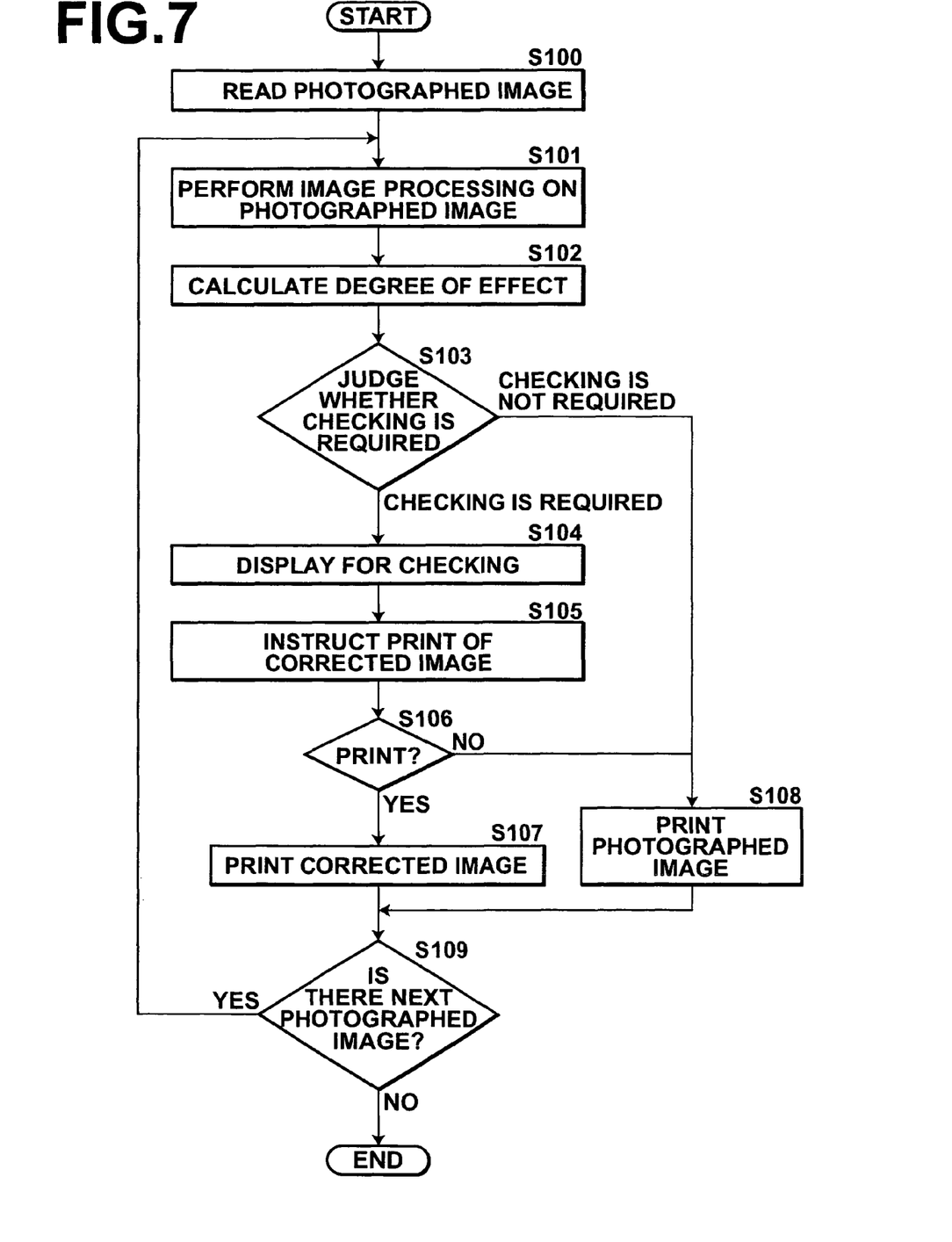
FIG. 7 is a flow chart illustrating a procedure for printing at an image output apparatus.

Here, a procedure for printing a corrected image onto printer paper by using the image output apparatus according to the present invention will be described with reference to the flow chart illustrated in FIG. 7.

First, the image output apparatus 1 reads the photographed image P1 from a memory-type recording medium, for example (step S100). The correction means 10 automatically performs specified correction processing on the photographed image P1 based on the settings at the image output apparatus 1 (step S101). When correction processing is performed on the photographed image P1, the effect of some kinds of correction processing is high, however the effect of some kinds of correction processing is low. For example, when red-eye correction processing is performed, the effect of processing is very high. Therefore, the degree of effect in red-eye correction processing will be specifically described below.

For example, if red-eye correction processing is specified, the face detection means 60 detects the facial region of a subject in the photographed image P1, first. Further, the red-eye detection means 70 detects a red-eye region in the detected facial region. If a red-eye region is detected, red-eye correction processing is automatically performed on the image to obtain the corrected image P2. In red-eye correction processing, the hue of pixels in the red-eye region is changed from red to black, based on the hue and saturation of pixels in the detected pupil, so that the color of the pupils becomes a normal color.

The effect of red-eye correction is higher as the area of the face, detected by the face detection means 60, is larger. The effect of red-eye correction is higher as the area of the red-eye region, detected by the red-eye detection means 70, is larger. Further, it may be considered that the effect of red-eye correction is higher as the amount of change in a pixel value per pixel in the region of the pupil is larger. Therefore, the effect degree calculation means 10 obtains the degree K of effect of red-eye correction based on the area D1 of the extracted face, the area D2 of the pupil, the amount Δh of change in a pixel value per pixel included in the pupil, or the like, for example (step S102). For example, the relationship of the degree K of effect with the area D1 of the face, the area D2 of the pupil, and the amount Δh of change in a pixel value per pixel included in the pupil may be represented by the following equation (1):

$$K = f(D1, D2, \Delta h) \quad (1)$$

f: function.

Alternatively, in camera-shake correction processing, the effect is different depending on the magnitude of the camera shake, corrected in the correction processing, and the size of the subject. Therefore, the degree of effect is obtained based on the magnitude of the camera shake and the size of the subject.

In the case that a plurality of correction processes are administered on a single photographed image, the degrees of effect obtained from each correction process is weighted to calculate the degree of effect for the corrected image. Particularly, processes that perform correction on a portion of an image, such as red eye correction and skin beautification, result in greatly different visual impressions between the original image and a corrected image. Therefore, the degrees of effect for these processes are weighted heavily. On the other hand, cases, such as those in which the brightness of the entire image is automatically corrected by employing auto setup functions according to preset conditions, do not result in great differences in visual impressions between the original image and a corrected image. Therefore, the degrees of effect for these types of processes are weighted lightly. Alternatively, in the case that conditions are set manually then setup is performed, the degree of effect may be set to be small if only a portion of the image changes slightly, and the degree of effect may be set to an intermediate level if the entire image changes.

In the case that a correction process, such as skin beautification, is administered, the degree of effect may be varied according to the size, the inclination, and the position within an image of the face, which was detected by the face detection means 60. For example, the effect is great in cases that the area of the face, to which the correction process is administered, constitutes a large percentage of the image. The effect is great also in cases in which the face is pictured toward the center of the photographed image. In addition, the effect is great for faces which are not inclined and face straight toward the camera, but not as great for faces which are inclined or face sideways.

When the obtained degree K of effect is high, it is preferable to print the corrected image P2. However, in some cases, users such as photographers want to print the photographed image as obtained by photography. Therefore, processing is performed to make a user check whether the corrected image P2 should be printed. At this time, it is preferable that the corrected image P2 and the photographed image P1 before correction are displayed side by side so that the user can recognize the effect of correction processing.

Therefore, the check requirement judgment means 20 judges, based on the magnitude of the degree of effect, whether it is required to check the effect of correction processing performed on the photographed image P1 (step S103), and sends a corrected image P2, in which the degree K of effect is higher than a predetermined threshold value, and its photographed image P1 to the display buffer 31. When the corrected image P2 and the photographed image P1 are sent to the display buffer 31, they are put in a wait state for being displayed to check the effect of correction processing. The check display means 30 displays the corrected image P2 and the photographed image P1, stored in the display buffer 31, side by side on a display device based on an instruction from the user (step S104).

The user checks the displayed corrected image P2. If the user thinks that the effect of correction is high, he/she instructs print of the corrected image P2 (step S105). Then, the corrected image P2 is sent from the display buffer 31 to the output buffer 41, and the print means sequentially prints the corrected image (step S107). If the user judges that the photographed image before correction processing is better, he/she does not instruct print of the corrected image P2. Then, the photographed image P1 is sent to the output buffer 41, and the photographed image P1 is printed. Processing in steps S101-S108, as described above, is performed on all of the photographed images (step S109).

In the above description, a case of performing image processing has been explained. However, if image processing is not performed on the photographed image P1 because a red-eye region is not detected in the photographed image P1, or the like, the images are not displayed for the purpose of checking the effect of correction processing.

In the above description, a case of sequentially displaying images, in which the degree K of effect is higher than a predetermined threshold value, so as to check the effect of correction processing has been explained. However, it is preferable that corrected images, in which the degree K of effect exceeds a predetermined threshold value, are temporarily stored in the display buffer 31, and the stored images are displayed in decreasing order of the degree K of effect, from an image in which the degree is the highest. In this method, a corrected image, in which the degree of effect is high, can be easily selected and printed.

In the above description, the corrected image and the photographed image are displayed side by side to check the effect of correction processing. However, the display may be switched between the corrected image and the photographed image. Alternatively, only the corrected image may be displayed.

In the above description, a case of detecting the red-eye region after detecting the face of the subject has been explained. However, after a candidate red-eye region is detected, a facial region may be detected by matching the face with patterns based on the red-eye candidate.

Figure 8:
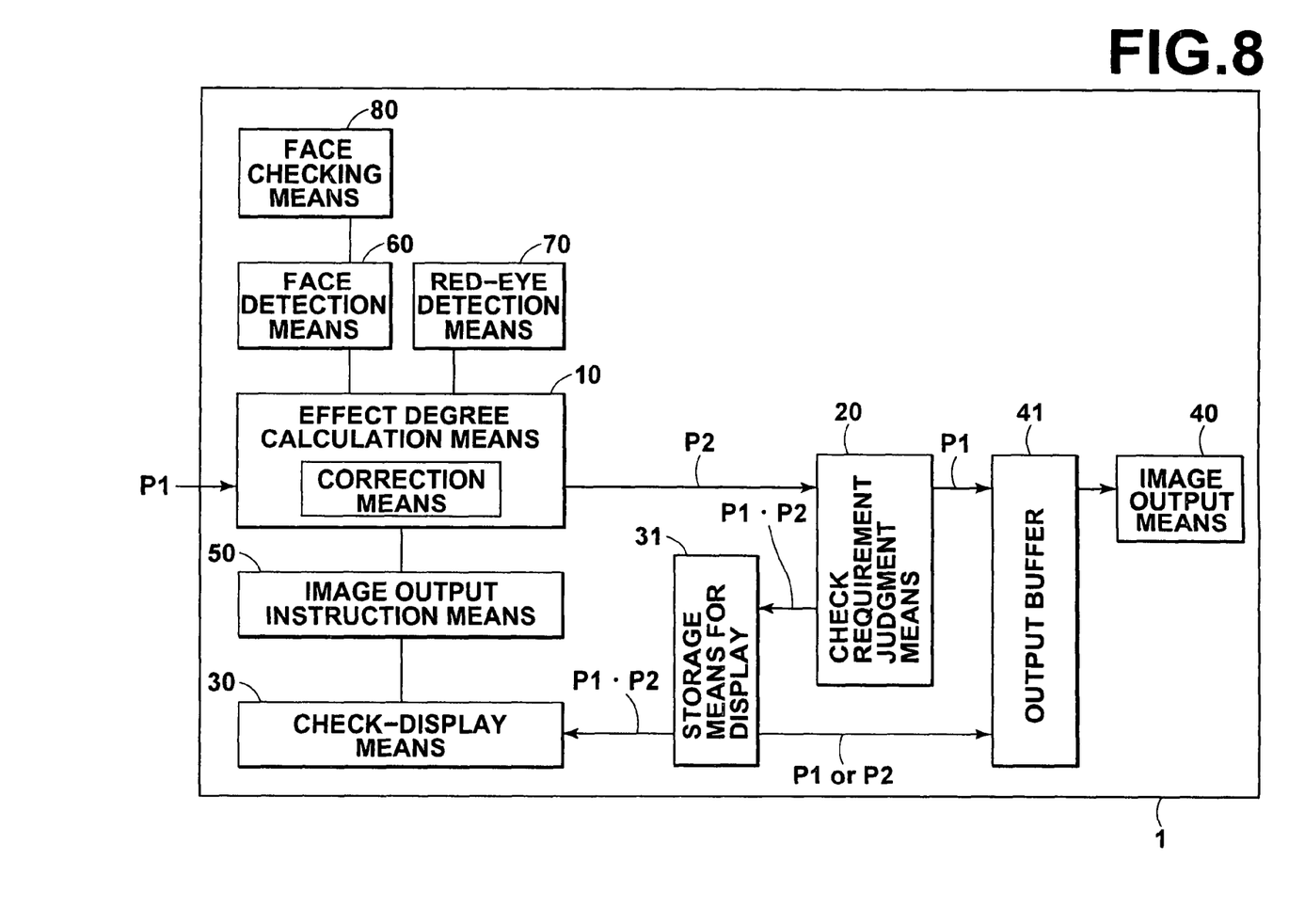
FIG. 8 is a diagram illustrating the schematic construction of an image output apparatus equipped with a face checking means.

The image output apparatus 1 may be equipped with a face checking means 80, as illustrated in FIG. 8. If this configuration is adopted, the degree of effect may be increased in the case that a specific person is pictured in the photographed image. For example, the faces of family members may be registered. Then, faces detected by the face detection means 60 may be checked against the registered faces. In the case that the faces match those of family members, the degree of effect may be increased, and in the case that the faces do not match those of family members, the degree of effect may be decreased.

During check display of the corrected images P2, arrows may be displayed at locations at which correction, such as red eye correction, has been performed, in order to indicate the corrected locations. Alternatively, a corrected human face may be enlarged and displayed, or corrected locations may be displayed in a blinking manner.

Further, the contents of the correction processing having a large degree of effect, which was administered on a corrected image, may be printed on the rear surface of a print medium, on the front surface of which the corrected image is printed. For example, "Red Eye Correction" may be printed on the rear surface of a print medium, on which an image having had red eye correction administered thereon is printed. As another example, "Blur Correction" may be printed on the rear surface of a print medium, on which an image having had blur correction administered thereon is printed. Alternatively, bar codes corresponding to the correction processing administered on the corrected image may be printed on the rear surface of the print medium.

In the above description, cases in which the corrected image P2 is printed has been described. Alternatively, the image output means 40 may be a recording device for recording the corrected images onto an electronic recording medium, such as a memory type recording medium. In addition, the original photographed image maybe recorded in the electronic recording medium, along with the corrected image. Further, data regarding degree of effect, the contents of correction processing, and whether the corrected image was checked, may also be attached to the corrected image and recorded.

Other examples of correction processing include: focus correction processing, exposure adjustment processing, and color correction processing, in addition to the aforementioned red eye correction processing and the blur correction processing.

As described above in detail, if an image, in which the degree of effect is high, is displayed to make the user check the image, the user can check the effect of correction processing and can instruct print of the image. Further, the user can check the effect of processing, and only images, which are specified by the user, are printed among the corrected images. Therefore, photograph shops or the like, which provide photo finish services, can get charges for correction processing in addition to ordinary charges for print.

What is claimed is:

1. An image output apparatus comprising:
  a correction means for performing correction processing on a region requiring correction in an original photographed image obtained by taking a photograph of a subject and obtaining a corrected image;
  a face detection means for detecting a face of the subject, wherein the region that requires correction is a facial region, detected by the face detection means;
  a face checking means, for checking whether the detected face is one of a plurality of faces of subjects, which are registered in advance;
  an effect degree calculation means for calculating a degree of effect in the obtained corrected image after performing correction processing on the region that requires correction, by comparing the obtained corrected image to the original photographed image, wherein the effect degree calculation means calculates the degree of effect according to whether the checked face is the face of one of the pre-registered subjects and a value of the calculated degree of effect is greater when the checked face matches the pre-registered subject face and smaller when the checked face does not match the pre-registered subject face;
  a check requirement judgment means for judging, based on a magnitude of the degree of effect, whether it is required to check the effect of correction processing performed on the original photographed image;
  a check display means for displaying at least the corrected image from between the photographed image and the corrected image to check the effect of correction processing if the check requirement judgment means judges that it is required to check the effect of correction processing performed on the original photographed image;
  an image output instruction means for instructing output of the corrected image after the at least the corrected image from between the photographed image and the corrected image is displayed to check the effect; and
  an image output means for one of outputting the instructed corrected image, and outputting the original photographed image if the check requirement judgment means judges that it is not required to check the effect of correction processing,
  wherein the effect degree calculation means calculates the degree of effect according to an inclination of the detected face and wherein a value of the calculated degree of effect is greater when the facial region is disposed substantially straight toward a camera, which takes the photograph of the subject and smaller when the facial region is inclined toward the camera.

2. The image output apparatus as defined in claim 1, wherein:
  the image output means is a printer.

3. The image output apparatus as defined in claim 2, wherein:
  the printer prints the instructed corrected image onto a front surface of a print medium, and prints the contents of the correction processing having a great degree of effect, which was administered on the original photographed image, on the rear surface of the print medium.

4. The apparatus as defined in claim 2, wherein the printer prints only the obtained corrected images and is precluded from printing corresponding non corrected images.

5. The image output apparatus as defined in claim 1, wherein:
  the image output means is a recording device for recording onto electronic recording media.

6. The image output apparatus as defined in claim 5, wherein:
  the recording device records the original photographed image in an electronic recording medium along with the instructed corrected image.

7. The image output apparatus as defined in claim 1, wherein:
  a plurality of correction processes is performed; and
  the effect degree calculation means weights the degree of effect for each of the correction processes when calculating the degree of effect.

8. The image output apparatus as defined in claim 1, wherein:
  the effect degree calculation means calculates the degree of effect according to an area of the region that requires correction.

9. The image output apparatus as defined in claim 1, wherein:
the effect degree calculation means calculates the degree of effect according to variations in pixel values of the region, that requires correction, between the obtained corrected image and the original photographed image.

10. The image output apparatus as defined in claim 1, wherein if the degree of effect in the corrected image is greater than a predetermined threshold value, the check requirement judgment means judges that it is required to check the effect of correction processing in the obtained corrected image.

11. The image output apparatus as defined in claim 1, wherein the check display means displays at least one of the original photographed image and corrected images selected from a plurality of corrected images sequentially in decreasing order of the degree of effect, from the corrected image in which the degree of effect is the highest, to check the effect of correction processing in each selected corrected image.

12. The image output apparatus as defined in claim 1, wherein the effect degree calculation means calculates the degree of effect according to an area of the facial region and wherein a value of the calculated degree of effect increases with an increase of a ratio of the facial region to the original photographed image.

13. The image output apparatus as defined in claim 1, wherein the effect degree calculation means calculates the degree of effect according to a position of the facial region, detected within the original photographed image, and wherein a value of the calculated degree of effect is greater when the facial region is disposed substantially close to a center of the original photographed image and smaller when the facial region is not disposed substantially close to the center of the original photographed image.

14. The image output apparatus as defined in claim 1, further comprising:
a red-eye detection means for detecting a red-eye region of the subject;, wherein the region that requires correction is a red-eye region of the subject, detected by the red-eye detection means, and the correction processing is red-eye correction processing.

15. The apparatus as defined in claim 1, wherein the image output instruction means instructs the output of the obtained corrected image after the effect of correction is confirmed.

16. The apparatus as defined in claim 1, wherein the effect degree calculation means calculates the degree of effect of correction processing in the obtained corrected image by weighting degrees of effect of each correction process performed on the original photographed image and adding the weighted degrees, based on a predetermined index, wherein a heavier weight is given to the correction processes that correct only a portion of the image and a lighter weight is given to the correction process that correct an entirety of the image.

17. The apparatus as defined in claim 1, wherein the check judgment requirement means judges that the obtained corrected image is to be checked if the degree of effect is greater than or equal to a predetermined threshold and wherein the check display means does not display the obtained corrected image for the check if the degree of effect is less than the predetermined threshold.

18. The apparatus as defined in claim 17, wherein the check judgment requirement means performs an automatic determination whether the obtained corrected image is to be checked based on an output of the effect degree calculation means.

19. A non-transitory computer-readable medium having recorded program instructions for causing a computer to function as:
a correction means for performing correction processing on a region requiring correction in an original photographed image obtained by taking a photograph of a subject and obtaining a corrected image;
a face detection means for detecting a face of the subject, wherein the region that requires correction is a facial region, detected by the face detection means;
a face checking means, for checking whether the detected face is one of a plurality of faces of subjects, which are registered in advance;
an effect degree calculation means for calculating a degree of effect in the obtained corrected image after performing correction processing on the region that requires correction, by comparing the obtained corrected image with the original photographed image, wherein the effect degree calculation means calculates the degree of effect according to whether the checked face is the face of one of the pre-registered subjects and a value of the calculated degree of effect is greater when the checked face matches the pre-registered subject face and smaller when the checked face does not match the pre-registered subject face;
a check requirement judgment means for judging, based on a magnitude of the degree of effect, whether it is required to check the effect of correction processing performed on the original photographed image;
a check display means for displaying at least the corrected image from between the photographed image and the corrected image to check the effect of correction processing if the check requirement judgment means judges that it is required to check the effect of correction processing performed on the original photographed image;
an image output instruction means for instructing output of the corrected image after the at least the corrected image from between the photographed image and the corrected image is displayed to check the effect; and
an image output means for one of outputting the instructed corrected image, and outputting the original photographed image if the check requirement judgment means judges that it is not required to check the effect of correction processing,
wherein the effect degree calculation means calculates the degree of effect according to an inclination of the detected face and wherein a value of the calculated degree of effect is greater when the facial region is disposed substantially straight toward a camera, which takes the photograph of the subject and smaller when the facial region is inclined toward the camera.

20. An image output method comprising:
performing correction processing on a region requiring correction, in an original photographed image obtained by taking a photograph of a subject;
obtaining a corrected image;
comparing the obtained corrected image, after performing correction processing, to the original photographed image;
detecting a face of the subject, wherein the region that requires correction is a facial region;
checking whether the detected face is one of a plurality of faces of subjects, which are registered in advance;
calculating a degree of effect in the obtained corrected image, based on comparing, wherein the degree of effect is calculated according to whether the checked face is the face of one of the pre-registered subjects and a value of the calculated degree of effect is greater when the checked face matches the pre-registered subject face and smaller when the checked face does not match the pre-registered subject face;

judging, based on a magnitude of the degree of effect, whether it is required to check the effect of correction processing performed on the original photographed image;

displaying at least the corrected image from between the photographed image and the corrected image to check the effect of correction processing, if it is judged that it is required to check the effect of correction processing performed on the original photographed image;

instructing output of the obtained corrected image after the at least the corrected image from between the photographed image and the corrected image is displayed to check the effect; and one of:

outputting the instructed corrected image, and outputting the original photographed image if it is judged that it is not required to check the effect of correction processing, wherein the calculating the degree of effect comprises calculating the degree of effect according to an inclination of the detected face and wherein a value of the calculated degree of effect is greater when the facial region is disposed substantially straight toward a camera, which takes the photograph of the subject and smaller when the facial region is inclined toward the camera.

* * * * *